April 17, 1956  R. C. DREIER  2,742,315
DETACHABLE HANDLE ASSEMBLY
Filed Sept. 27, 1950
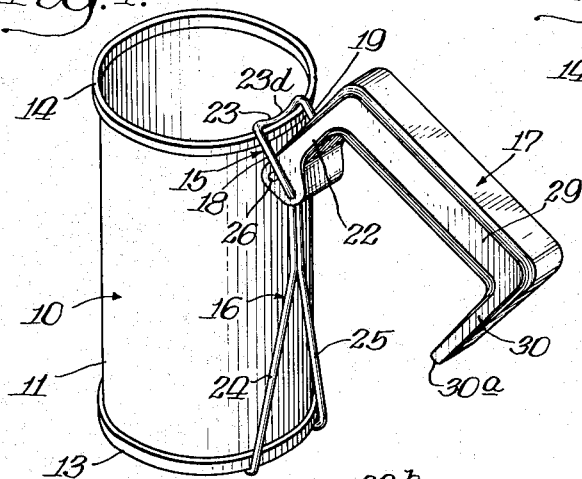
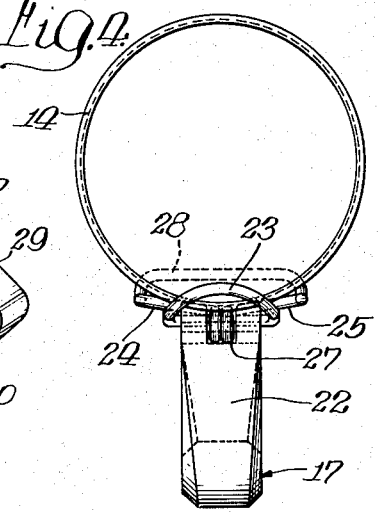
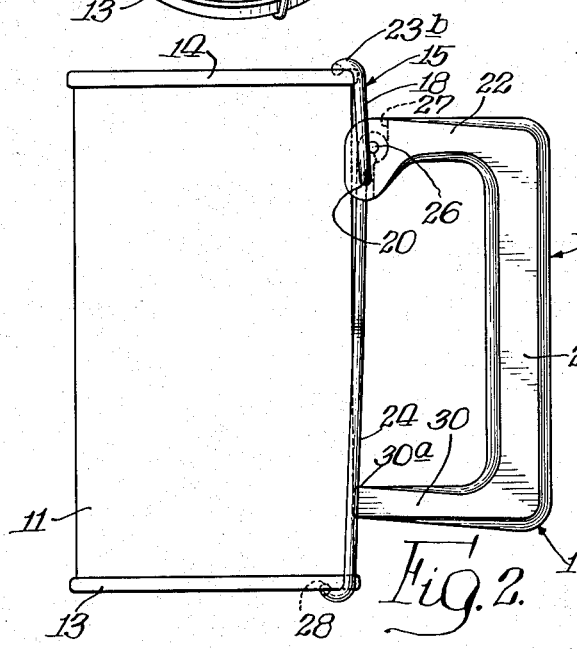
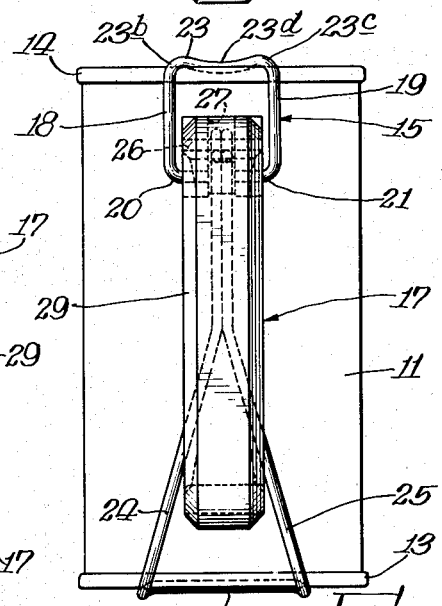
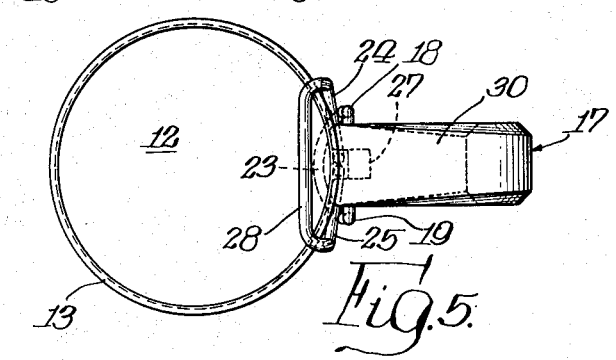
INVENTOR.
Raymond C. Dreier,
BY
Smith, Olsen + Baird
Attys.

United States Patent Office 2,742,315
Patented Apr. 17, 1956

2,742,315

DETACHABLE HANDLE ASSEMBLY

Raymond C. Dreier, Shawano, Wis., assignor to Dreier Brothers, Inc., Chicago, Ill., a corporation of Illinois Application September 27, 1950, Serial No. 187,028

4 Claims. (Cl. 294—27)

The present invention relates to handles for containers and more specifically to an improved detachable handle particularly suited for use in conjunction with rigid containers of various kinds, including metal cans of the type now widely used for packaging food products, beer and other beverages.

The present handle assembly, in its preferred form, comprises only three main parts: two container engaging members and a handle proper. The two container engaging members are arranged to embrace the upper and lower rims of a container, respectively, and are rotatably secured to the handle proper about separate axes, the handle itself being movable about these axes. With the handle in a raised or release position, the extremities of the container engaging members are separated sufficiently to permit one of the members to be fitted over the upper rim of a container and the other member to be fitted over the lower rim of the container. Upon pivoting the handle downwardly toward a clamping position, the extremities of the two container engaging members are drawn together to clamp the container therebetween to secure the handle assembly to the container. The two axes about which the container engaging members are rotatably secured to the handle are so disposed with respect to each other and to the container that the handle passes through an over-center position during this movement to retain the handle and the remainder of the assembly in its clamping condition, and when the container is lifted by the handle the moment about the axes caused by the weight of the container tends also to retain the assembly in its clamping condition. The handle proper is provided with a protrusion which contacts the wall of the container when the handle has been moved into its clamping position, thus insuring that the handle will not be rotated beyond this position.

These characteristics, together with other objects and advantages of the present invention, will be apparent from the following description of a preferred embodiment thereof particularly suitable for use in conjunction with rigid containers of the type now widely used for packaging beer, the description being taken with the accompanying drawing in which:

Fig. 1 is a perspective view of the handle assembly applied to a container, the handle proper being shown in its raised or release position;

Fig. 2 is a side elevational view showing the handle assembly applied to the container with the handle proper in its clamping position;

Fig. 3 is an end view taken from the right of Fig. 2;

Fig. 4 is a top plan view of the handle and container in the condition shown in Figs. 2 and 3; and Fig. 5 is a bottom plan view of the same.

In the drawing the numeral 10 indicates, generally, a rigid cylindrical metal container or can of a type with which the detachable handle assembly of the present invention may be used with particular convenience and success. As illustrated in the drawing, the container comprises a cylindrical side wall 11 and a circular bottom 12 (Fig. 5) secured in the usual manner to the side wall by a crimp or bead 13. A top similar to the bottom 12 is shown in the drawing as having been removed, a crimp or bead 14 remaining on the top edge of the cylindrical wall 11 and having previously served to secure the top of the container to the cylindrical side wall. Such cans or containers are widely used for packaging beer and other beverages and liquid foods.

The detachable handle assembly of the present invention is shown in conjunction with the above described can or container and comprises, as its three main component parts, container engaging members 15 and 16 and a C-shaped handle 17. The member 15, as shown, is in the form of a loop fabricated of relatively heavy wire or the like, comprising two parallel legs 18 and 19 having opposed, inturned ends 20 and 21 (Fig. 3) which are pivotally received, respectively, in suitable openings provided on the opposite sides and near the extremity of an upper leg 22 of the handle 17. At their outer ends the legs 18 and 19 of the container engaging member 15 are joined together by a cross member 23 which is bent inwardly as at 23b and 23c (Figs. 2 and 3) and then arched downwardly as at 23d (Fig. 3) so as to provide a surface at the extremity of the member 15 adapted to embrace the upper bead 14 of the container. The container engaging member 16, like the member 15, may be formed of wire or the like and comprises two leg parts 24 and 25 which, at their uppermost ends, are rotatably looped around a pivot pin 26 which extends through the leg 22 of the handle 17, the pin 26 being disposed parallel and adjacent to the openings previously mentioned for receiving the inturned ends 20 and 21 of the container engaging member 15. The pin 26 is also slightly offset with respect to these openings, as will best be seen in Fig. 2, and is disposed in the body of the leg 22 above the openings. A suitable slot 27 is centrally provided in the end of the leg 22 of the handle in order that the upper ends of the legs 24 and 25 of the container engaging member 16 may be rotatably attached to the approximate center of the pin 26 without interfering with the movement of the handle as described below.

The upper portions of the legs 24 and 25 of the container engaging member 16, as viewed in the drawing, are arranged in parallel side by side position and extend downwardly from the pin 26 to a point about midway in their length where they flair outwardly and extend downwardly along the side of the container to their lowermost extremities opposite the bead 13 on the bottom edge of the container. At their lowermost extremities the legs 24 and 25, like the legs 18 and 19 of the container engaging member 15, are jointed by a cross member 28 which, similarly to the member 23, is curved and arched so as to provide a surface adapted to embrace the lowermost edge of the container and the bead 13 thereon.

The handle 17 is of a "C" shape, fabricated of wood, plastic or the like, and comprises the upper leg portion 22 previously mentioned, as well as a grip portion 29 and a lower leg 30 of approximately the same length as the leg 22. The lower leg 30 is approximately parallel to the leg 22 and its inner end 30a is arranged to contact the side 11 of the container and act as a stop in the movement of the handle as described below.

In applying the handle assembly to the container, the handle 17 is first raised to its release position as shown in Fig. 1. In this position, because of the relative disposition of the separate axes of rotation of the container engaging members 15 and 16, the container engaging members are separated to approximately their maximum extent. The lowermost extremity of the container engaging member 16, that is, the cross member 28, is then slipped over the lower bead 13 of the container and the uppermost extremity of the container engaging member 15, that is, the cross member 23, is slipped over the upper bead 14. In this condition both the upper and the lower edges of the container are lightly embraced by the opposite extremities of the container engaging members, said members being, in combined length, somewhat longer than the total height of the container. The handle 17 is then pivoted downwardly about the pin 26 and the inturned ends 20 and 21 of the container engaging member 15, the pin and the two inturned ends 20 and 21 being the separate rotational axes of the two container engaging members. In this movement of the handle downwardly, the handle quickly is brought to an over-center position resulting from the relative offset disposition of the two axes just mentioned. When this position has been reached, the extremities of the two container engaging members will have been brought forcefully into engagement with the upper and lower edges, respectively, of the container. Further rotation of the handle downwardly causes the handle to pass through the over-center position and, because of the positioning of the two axes and the lengths of the two container engaging members relative to the height of the container, to snap into full clamping position wherein the extremities of the container engaging members are brought further together to securely clamp the container therebetween and thus securely attach the handle assembly to the container. As the handle reaches its full clamping position, the end 30a of the lower leg 30 of the handle comes into contact with the side wall 11 of the container and thus acts as a stop to prevent movement of the handle through or beyond its full clamping position. The stop action of the end 30a of the leg 30 of the handle, together with existence of the over-center position previously explained, serves to insure that the handle will remain in its full clamping position and thus that the handle assembly will remain securely attached to the container unless intentionally removed therefrom. It will also be noted that, because the axes of rotation of the container engaging members are located in the handle to one side of the container and in a horizontal position substantially normal to a vertical plane containing the upright geometric axis of the container, the moment about these axes caused by the weight of the container when it is lifted by the handle tends also to retain the handle and container engaging members in their securely attached positions on the container. To remove the handle assembly from the container, the operation just described is reversed.

From the foregoing description it will be apparent that the present handle assembly may be used in conjunction with substantially all rigid containers of uniform height or distance between the edges grasped by the container engaging members. For containers having another height or distance between such edges, the present handle assembly may be fabricated with longer or shorter container engaging members, as the case may be. The present handle assembly comprises but a minimum of parts, all of which are easily and inexpensively manufactured, and the assembly is attractive in appearance. For example, when a C-shaped handle is used as shown in the drawing, the handle assembly when applied to a beer can creates the effect of a stein.

The foregoing description has been given for clearness of understanding, and no unnecessary limitations should be inferred therefrom, for it will be apparent to those skilled in the art that various changes may be made in the construction and application of the invention without departing from the spirit and scope of the appended claims.

I claim:

1. A detachable handle assembly for mounting along a side wall of an upright rigid container, comprising, a handle of substantial size adapted to be grasped in the hand to support said container, a first container engaging member rotatably mounted about an axis on said handle and having a surface thereon adapted to embrace a portion of an upper edge of said container, a second container engaging member rotatably mounted about a second axis on said handle and having a surface thereon adapted to embrace a portion of a lower edge of said container, said handle being movable about said first and second axes from a release position to a clamping position wherein said container engaging members are forcefully engaged with said edges, said first and second axes being substantially normal to a vertical plane intersecting said axes and containing the upright geometric axis of said container, said first and second axes being so arranged and disposed with respect to each other and said container engaging members being of such dimensions that in the movement of said handle into said clamping position said second axis must pass through an over-center position above said first mentioned axis, thereby causing said handle to snap into said clamping position, the moment about said first and second axes caused by the weight of said container when the same is lifted by said handle being in a direction tending to retain said handle and said container engaging members in said clamping position.

2. A detachable handle assembly for mounting along a side wall of an upright rigid container, comprising, an upstanding rigid handle of such size and shape as to be grasped in the hand to support said container, a first container engaging member rotatably mounted about an axis in the upper extremity of said handle and having a surface thereon adapted to embrace a portion of an upper edge of said container, a second container engaging member rotatably mounted about a second axis in the upper extremity of said handle and having a surface thereon adapted to embrace a portion of a lower edge of said container, said first and second axes being substantially normal to a vertical plane intersecting said axes and containing the upright geometric axis of said container, and said handle being movable about said first and second axes from a release position to a clamping position wherein said container engaging members are forcefully engaged with said edges, and a protrusion on the lower extremity of said handle engageable with said container for preventing movement of said handle beyond said clamping position, the moment about said first and second axes caused by the weight of said container when the same is lifted by said handle being in a direction tending to retain said handle and said container engaging members in said clamping position.

3. A detachable handle assembly for mounting along a side wall of an upright rigid container, comprising, an upstanding rigid handle of such size and shape as to be grasped in the hand to support said container, a first container engaging member rotatably mounted about an axis in the upper portion of said handle and having a surface thereon adapted to embrace a portion of an upper edge of said container, a second container engaging member rotatably mounted about a second axis on said handle and having a surface thereon adapted to embrace a portion of a lower edge of said container, said handle being movable about said first and second axes from a release position to a clamping position wherein said container engaging members are forcefully engaged with said edges, and a protrusion on said handle engageable with said container for preventing movement of said handle beyond said clamping position, said first and second axes being substantially normal to a vertical plane intersecting said axes and containing the upright geometric axis of said container, said first and second axes being so arranged and disposed with respect to each other and said container engaging members being of such dimensions that in the movement of said handle into said clamping position said second axis must pass through an over-center position above said first axis, thereby causing said handle to snap into said clamping position, the moment about said first and second axes caused by the weight of said container when the same is lifted by said handle being in a direction tending to urge said handle toward clamping position.

4. A detachable handle assembly for mounting along a side wall of an upright rigid container, comprising, an upstanding rigid handle of such size and shape as to be readily grasped in the hand to support said container, a first container engaging member rotatably mounted at one of its ends about an axis in the upper extremity of said handle and having at its opposite end a surface adapted to embrace an upper edge of said container, a second container engaging member rotatably mounted at one of its ends about a second axis in said upper extremity of said handle and having at its opposite end a surface adapted to embrace a lower edge of said container, said first and second axes being substantially normal to a plane intersecting said axes and containing the upright geometric axis of said container, said first and second axes being so disposed and arranged with respect to each other that pivotal movement of said handle about said axes downwardly toward said lower edge of said container will move said edge embracing surfaces toward each other to clamp said container therebetween and thereby secure said handle assembly to said container, the moment about said first and second axes caused by the weight of said container when the same is lifted by said handle being in a direction urging said handle toward clamping position.

References Cited in the file of this patent

UNITED STATES PATENTS

| | | |
|---|---|---|
| 651,437 | Hebert | June 12, 1900 |
| 779,297 | Love et al. | Jan. 3, 1905 |
| 1,209,676 | Cooper | Dec. 26, 1916 |
| 2,010,317 | Olson | Aug. 6, 1935 |
| 2,445,265 | Hargrave | July 13, 1948 |
| 2,474,913 | Propst | July 5, 1949 |

FOREIGN PATENTS

| | | |
|---|---|---|
| 69,736 | Norway | Nov. 5, 1945 |